(12) United States Patent
Bittlingmaier

(10) Patent No.: US 9,499,015 B2
(45) Date of Patent: Nov. 22, 2016

(54) ROTARY FEEDTHROUGH FOR A VEHICLE WHEEL

(71) Applicant: Kessler & Co. GmbH & Co. KG, Abtsgmund (DE)

(72) Inventor: Gunter Bittlingmaier, Aalen-Ebnat (DE)

(73) Assignee: Kessler & Co. GmbH & Co. KG, Abtsgmund (DE)

( * ) Notice: Subject to any disclaimer, the term of this patent is extended or adjusted under 35 U.S.C. 154(b) by 0 days.

(21) Appl. No.: 14/726,912

(22) Filed: Jun. 1, 2015

(65) Prior Publication Data

US 2015/0352911 A1    Dec. 10, 2015

(30) Foreign Application Priority Data

Jun. 6, 2014 (DE) .................. 10 2014 108 028

(51) Int. Cl.
*B60C 23/00* (2006.01)
*B60B 27/00* (2006.01)
*F16L 27/087* (2006.01)

(52) U.S. Cl.
CPC ......... *B60C 23/003* (2013.01); *B60B 27/0073* (2013.01); *F16L 27/087* (2013.01)

(58) Field of Classification Search
CPC . B60C 23/003; F16L 27/087; B60B 27/0073
See application file for complete search history.

(56) References Cited

U.S. PATENT DOCUMENTS

| | | | | |
|---|---|---|---|---|
| 4,892,128 A * | 1/1990 | Bartos | ................... | B60C 23/003 137/580 |
| 5,147,494 A * | 9/1992 | Torii | ..................... | B60C 23/003 156/417 |
| 6,145,558 A * | 11/2000 | Schmitz | ................ | B60C 23/003 152/416 |
| 6,575,269 B1 * | 6/2003 | Skoff | ................... | B60C 23/003 152/416 |
| 9,162,539 B2 * | 10/2015 | Hibbler | ................ | B60C 23/003 |
| 2008/0314487 A1 * | 12/2008 | Walter | ................. | B60C 23/003 152/418 |
| 2010/0181739 A1 * | 7/2010 | Eschenburg | ......... | B60C 23/003 280/124.125 |
| 2014/0062031 A1 * | 3/2014 | Honzek | ................ | B60C 23/003 277/551 |

(Continued)

FOREIGN PATENT DOCUMENTS

| | | |
|---|---|---|
| DE | 827605 C | 1/1952 |
| DE | 8705739.5 | 10/1987 |
| DE | 102009057158 A1 | 6/2011 |

(Continued)

*Primary Examiner* — Kip T Kotter
(74) *Attorney, Agent, or Firm* — Dinsmore & Shohl LLP; Douglas W. Sprinkle

(57) ABSTRACT

A rotary feedthrough for a motor vehicle wheel having tire pressure regulation comprises a wheel carrier and a wheel hub rotatably supported on the wheel carrier. A compressed air annular space and at least one annular lubricant space, which are sealed with respect to one another, are configured in an intermediate space between the wheel carrier and the wheel hub. In this respect, the compressed air annular space communicates with a compressed air passage of the wheel carrier and with a compressed air passage of the wheel hub, wherein the compressed air passage of the wheel hub communicates with a controllable valve in order selectively to fill a tire of the motor vehicle wheel with compressed air or to deflate the tire. The annular lubricant space in turn communicates with a lubricant passage of the wheel carrier and with a lubricant passage of the wheel hub, wherein the lubricant passage of the wheel hub leads to a control port of the valve in order selectively to control the valve for the passage of compressed air.

13 Claims, 3 Drawing Sheets

(56) References Cited

U.S. PATENT DOCUMENTS

2015/0068653 A1* 3/2015 Cis ................... B60C 23/003
        152/417
2015/0290986 A1* 10/2015 Tsiberidis ............ B60C 23/003
        152/417

FOREIGN PATENT DOCUMENTS

| DE | 102013205399 A1 | 10/2014 |
| DE | 102013013509 A1 | 2/2015 |
| WO | 0042337 A1 | 7/2000 |

* cited by examiner

ROTARY FEEDTHROUGH FOR A VEHICLE WHEEL

CROSS-REFERENCE TO RELATED APPLICATIONS

This application claims priority of German Patent Application 10 2014 108 028.9 filed on Jun. 6, 2014.

FIELD OF THE INVENTION

The invention relates to a rotary feedthrough for a motor vehicle wheel having tire pressure regulation.

BACKGROUND OF THE INVENTION

A wheel of a motor vehicle typically has a wheel hub that is rotatably supported on a wheel carrier (e.g. an axle arm or an axle funnel). A tire pressure regulation apparatus is provided for some applications, for example for heavy commercial vehicles, in order to set the air pressure in the tire mounted on the wheel hub to a desired value. In order to be able to supply the tire with the compressed air required for this purpose, the compressed air has to be transferred, for example starting from a central compressed air source, from the respective wheel carrier to the wheel hub supported thereat. The same applies accordingly in the opposite direction for deflating the tire. This is achieved by the rotary feedthrough which comprises a substantially ring-shaped intermediate space between the wheel carrier and the wheel hub in which a compressed air annular space is formed. It communicates both with a compressed air passage provided in the wheel carrier and with a compressed air passage provided in the wheel hub. In this manner, the named compressed air passages are also connected to one another when the wheel hub is rotating so that compressed air can be supplied to the tire via the compressed air passages, independently of the rotational position of the wheel hub.

Very high pressures are consequently generated for the desired tire pressure regulation, for example, up to approximately 7 bar. A compressed air annular space formed in the intermediate space between the wheel carrier and the wheel hub must therefore be reliably sealed with respect to the environment and in particular with respect to the remaining intermediate space. This can take place, for instance, by means of sealing rings, in particular by means of radial shaft sealing rings, which bound the compressed air annular space at both sides and in particular with respect to annular lubricant spaces which are formed in the remaining intermediate space and which can serve, for example, for lubricating the sealing rings and/or bearings for supporting the wheel hub at the wheel carrier.

So that the pressure in the tire of a respective motor vehicle wheel can be varied, controllable valves are employed at the wheel hub, that is, in particular valves that can be selectively controlled either to let compressed air pass through into a respective filling direction or deflating direction or to block the passage of compressed air. In this respect, systems for regulating tire pressure can, for example, be configured as single-passage systems, i.e. having only a single compressed air passage in the wheel hub which leads to the valve, or as multi-passage systems in particular two-passage systems.

With two-passage systems, a compressed air passage in the wheel hub additionally leading to a valve exclusively serves for controlling the switch position of the valve. Two-passage systems have the advantage that a standard valve can be used at the tire whose air pressure should be able to be regulated. As a rule, such a standard valve comprises a compressed air port, a working port (2/2-way valve) and optionally a venting connection (3/2-way valve). For controlling the valve, that is in particular for blocking or (directed) opening of the valve, the valve can also have a control port which is actuated via the additional compressed air passage. In this respect, the valve can be selectively controlled via the pressure applied to the control port or via the power hereby caused at the control port to connect the compressed air port or the venting connection to the working port for the passage of compressed air or to block these connections with respect to one another. In so doing, the valve is preferably preloaded in a blocking state in order to maintain the tire pressure on a failure of the pressure or of the power at the control port.

The disadvantage of such a two-passage system is that the rotary feedthrough must comprise at least two compressed air passages in the wheel hub so that at least two compressed air annular spaces must also be formed in the intermediate space between the wheel carrier and the wheel hub in order to connect the compressed air passages of the wheel hub to associated compressed air passages of the wheel carrier. These compressed air annular spaces, which can have completely different pressures, must be reliably sealed, in particular also with respect to one another; for instance, in that respective sealing rings are provided between them and at the two sides.

To minimize the wear of the sealing rings sliding along the wheel carrier or the wheel hub, lubricants, for example lubricating grease or lubricating oil, can be guided through lubricant passages from the wheel carrier into annular lubricant spaces which are provided in the named intermediate space between the wheel carrier and the wheel hub in addition to the compressed air annular spaces. The lubricant can hereby move to the respective sealing rings bounding the respective annular lubricant space. The wear can admittedly thereby be reduced, but not the comparatively high number of wear parts. Such an arrangement also requires a relatively large construction depth (extent of the named intermediate space along the direction of arrangement of the sealing rings).

A rotary feedthrough of such a two-passage system is known from the laying-open document DE 10 2009 057 158 A1.

In contrast, the valve position in single-passage systems is controlled by pressure impulses within the compressed air passage of the wheel hub. Single-passage systems can thus admittedly have a smaller construction depth of the named intermediate space and fewer wear parts since only a single compressed air passage is provided in the wheel hub for supplying the tire with compressed air and only a single compressed air annular space therefore also has to be formed in the intermediate space between the wheel carrier and the wheel hub. However, a single-passage system requires the use of a special valve which can only be controlled by means of the compressed air port which thus simultaneously functions as a compressed air inlet and a control port. However, such a special valve causes higher costs and necessitates a more complex control of the air pressure in the compressed air passage for a defined generation of the control pressure bursts. Furthermore, there is the risk of a certain proneness to disturbance.

SUMMARY OF THE INVENTION

It is the object of the present invention to provide a rotary feedthrough of a simple and compact design which is low in wear and inexpensive.

This object is satisfied by a rotary feedthrough having a compressed air annular space and at least one annular lubricant space which are sealed with respect to one another and which are formed in an intermediate space between the wheel carrier and the wheel hub, wherein the compressed air annular space communicates with a compressed air passage of the wheel carrier and with a compressed air passage of the wheel hub, wherein the compressed air passage of the wheel hub furthermore communicates with a controllable valve in order selectively to fill a tire of the motor vehicle wheel with compressed air or to deflate the tire, and wherein the annular lubricant space communicates with a lubricant passage of the wheel carrier and with a lubricant passage of the wheel hub, with the lubricant passage of the wheel hub leading to a control port of the valve in order selectively to control the valve for the passage of compressed air.

The advantages of customary single-passage tire pressure regulating systems and two-passage tire pressure regulating systems are achieved by such a rotary feedthrough and the disadvantages of these systems are simultaneously avoided. For, on the one hand, the named controllable valve can be a standard valve as described above which is simple and inexpensive. In this respect, the compressed air passage of the wheel hub can supply compressed air to the compressed air port of the valve, while the valve can be controlled via the pressure of the lubricant applied (directly or indirectly) to the control port, which lubricant is supplied to the control port through the lubricant passage of the wheel hub. In this sense, the rotary feedthrough in accordance with the invention is a two-passage system, wherein the two passages, however, differ from other two-passage systems to the extent that the one passage guides compressed air, but the other passage guides lubricant.

However, in spite of the two passages, the construction depth of the rotary feedthrough, i.e. its extent with respect to the (radial and/or axial) intermediate space between the wheel carrier and the wheel hub, can, on the other hand, be comparatively small and can be comparable to the construction depth of a single-passage solution. This is achieved in that the formation of a single compressed air annular space in the named intermediate space is sufficient for the rotary feedthrough in accordance with the invention. Since the second passage of the wheel hub is not a compressed air passage but rather a lubricant passage, an annular lubricant space can be used, instead of a further compressed air annular space, for supplying the second passage and thus for controlling the valve, which annular lubricant space is typically anyway present in the named intermediate space for sealing the compressed air annular space.

For supplying two compressed air passages of the wheel hub, in contrast, at least two compressed air annular spaces would have to be provided in the named intermediate space, which are also sealed with respect to one another (as a rule by an annular lubricant space arranged therebetween) and would have to be supplied with lubricant. In contrast, in the rotary feedthrough in accordance with the invention, the compressed air annular space for supplying the one (compressed air) passage of the wheel hub and the annular lubricant space for supplying the other (lubricant) passage of the wheel hub can advantageously be directly adjacent to one another. In this manner, the construction depth of the rotary feedthrough is minimized and contributes to a compact construction of the rotary feedthrough.

The annular lubricant space can in this respect in particular be supplied with lubricating oil or lubricating grease or another lubricant through the lubricant passage of the wheel carrier. This lubricant can in this respect serve for lubricating sealing elements such as sealing rings, in particular radial shaft sealing rings, for the sealing of the compressed air annular space so that these sealing elements seal reliably and are protected against premature wear. In the rotary feedthrough in accordance with the invention, however, the lubricant can, in addition to this function, also serve as a pressure medium whose pressure can, for example, be set at the side of the wheel carrier and can be transferred across the intermediate space between the wheel carrier and the wheel hub, by means of the lubricant passage of the wheel hub, to the valve in order to control the valve. In this respect, the same lubricant which is also used for lubricating other components, for instance, for lubricating bearings for supporting the wheel hub at the wheel carrier or for lubricating a transmission (e.g. a reduction gear between a drive shaft guided in the wheel carrier and the wheel hub) can in particular be used as a lubricant.

Advantageous embodiments of the invention will be described in the following.

For example, the compressed air annular space and the annular lubricant space can be bounded with respect to one another by a sealing ring (in an axial or in a radial direction). For bounding the compressed air annular space and/or the annular lubricant space, the respective annular space is in this respect in particular bounded with respect to the remaining intermediate space in two mutually opposite directions (corresponding to the extent of the intermediate space formed between the wheel carrier and the wheel hub) by a respective sealing ring. The use of sealing rings, which can in particular be radial shaft sealing rings, in such an arrangement, in this respect ensures a reliable sealing of the respective annular spaces, is simple in construction and allows a compact rotary feedthrough.

In a preferred embodiment, the sealing effect of the respective sealing ring bounding the compressed air annular space is controllable such that a pressing force of the sealing ring is increased with respect to the wheel carrier or the wheel hub by increasing the pressure of a lubricant in the annular lubricant space. In this manner, the sealing rings can so-to-say be "switchable". It is meant by this that the pressing force of respective sealing rings and thus their respective sealing effect, on the one hand, and resulting wear, on the other hand, can be set selectively via the pressure of the lubricant. The pressing force can in particular be changed for a time in order temporarily to adjust the sealing effect of the sealing rings. For example, a relatively low normal pressure of the lubricant can be sufficient for a sealing ring provided between the compressed air annular space and a respective annular lubricant space to reliably seal these annular spaces with respect to one another with minimal wear. However, in order to fill the tire of the motor vehicle wheel with compressed air, it can be necessary to increase the pressure of the compressed air to a value at which the predefined sealing effect would no longer be sufficient in the normal case. The sealing effect can then be temporarily adapted by increasing the pressure of the lubricant such that the compressed air annular space is also reliably sealed while the pressure of the compressed air is increased for the filling. If the pressure of the compressed air falls again, the pressure of the lubricant and thus the pressing force can also again be reduced in order to keep the wear of the sealing rings, which is dependent on the pressing force, as low as possible.

The intermediate space formed between the wheel carrier and the wheel hub can extend, starting from the wheel carrier, up to the wheel hub in a radial direction, with the compressed air annular space and the respective annular lubricant space in this case being sealed with respect to one another in an axial direction. Alternatively or additionally, however, it is also possible that the named intermediate space extends from the wheel carrier to the wheel hub in the axial direction, with the compressed air annular space and the respective annular lubricant space being sealed with respect to one another in a radial direction.

Exactly one compressed air annular space communicating with a compressed air passage of the wheel hub is preferably formed in the named intermediate space between the wheel carrier and the wheel hub. Further compressed air annular spaces can generally also be provided for the additional supply of the same compressed air passage or further compressed air passages of the wheel hub. However, a particularly compact construction depth of the rotary feedthrough is achieved in that only exactly one such compressed air annular space is provided.

It is furthermore preferred if the wheel hub comprises exactly one compressed air passage which communicates with the compressed air annular space formed in the named intermediate space. As already stated, the wheel hub can for other purposes also comprise further compressed air passages supplied across the named intermediate space. In contrast, a rotary feedthrough in which only one compressed air passage is provided in the wheel hub has a simpler design.

In a possible embodiment of the rotary feedthrough, a plurality of annular lubricant spaces communicating with the lubricant passage of the wheel carrier can be formed in the named intermediate space between the wheel carrier and the wheel hub. For example, the compressed air annular space can be adjacent toward both its sides to a respective annular lubricant space and can be reliably sealed in this manner. The respective annular lubricant spaces are in this respect supplied with lubricant in common via the named lubricant passage of the wheel carrier.

Alternatively, however, a plurality of annular lubricant spaces can also be formed in the named intermediate space between the wheel carrier and the wheel hub, which annular lubricant spaces communicate with a respective separate lubricant passage of the wheel carrier. The wheel carrier can therefore also comprise a plurality of lubricant passages for supplying respective different annular lubricant spaces.

Independently of the respective embodiment, all annular lubricant spaces preferably comprise "switchable" sealing rings in the named sense for their sealing or for the sealing of the compressed air annular space.

In accordance with a further development of one of the named embodiments having a plurality of annular lubricant spaces, exactly one of the plurality of annular lubricant spaces communicates with the lubricant passage of the wheel hub. Such an embodiment has the construction advantage that the lubricant passage of the wheel hub only has to have a tight connection to one of the annular lubricant spaces. Alternatively, however, it is also possible that a plurality of the annular lubricant spaces communicate with the lubricant passage of the wheel hub. The lubricant throughflow of the rotary feedthrough can thus be distributed over a plurality of annular lubricant spaces.

Independently of the other design of the rotary feedthrough, the lubricant passage of the wheel hub can be connected to the control port of the valve directly or via a pressure converter. Whether a pressure converter is necessary depends on the valve used and in particular on its control port. If the control port of the valve is suitable for converting hydraulic pressures directly into respective switching states of the valve, the lubricant passage of the wheel hub can be directly connected to the control port so that a pressure converter can be dispensed with. In contrast, however, it can be of advantage to use particularly simple and widely used mechanically switchable valves, for example, 2/2-way valves or 3/2-way valves. Since their control port is at times actuated mechanically, a pressure converter can be interposed in this case which is connected at the inlet side to the lubricant passage of the wheel hub and converts the hydraulic pressure of the lubricant at the output side into a mechanical movement, for instance of a piston or of a plunger, by which mechanical movement the control port of the valve is then actuated.

In a preferred embodiment, two annular lubricant spaces (preferably exactly two annular lubricant spaces) are formed in the named intermediate space between the wheel carrier and the wheel hub, with the compressed air annular space being formed between the two annular lubricant spaces. The compressed air annular space is thus flanked at both its sides by a annular lubricant space and it is reliably sealed in this manner.

In this connection, it is advantageous if the rotary feedthrough comprises four sealing rings, with each of the two annular lubricant spaces being bounded at both sides by a respective one of the four sealing rings, and with the compressed air annular space being bounded at both sides by the two middle ones of the four sealing rings. In other words, the four sealing rings (e.g. in an axial or in a radial sequence) define a total of three spaces, namely centrally the compressed air annular space and at both sides thereof a respective annular lubricant space. In this respect, the sealing rings in particular provide the sealing between the annular lubricant spaces and the compressed air annular space.

Provided that the named intermediate space extends, as already explained above, from the wheel carrier to the wheel hub in a radial direction, the compressed air annular space can be axially formed between the two annular lubricant spaces, with the compressed air annular space and the two lubricant ring spaces being bounded by the sealing rings in an axial direction.

In accordance with a further development, it is furthermore preferred if each of the named four sealing rings is formed as a radial shaft sealing ring which comprises an open front side and a closed back which extends in a radial direction, with the open front side of each radial shaft sealing ring facing one of the two annular lubricant spaces. In this respect, the radial shaft sealing ring can essentially be "U"-shaped so that the back forms the base of the "U" from where the limbs of the "U" face away axially and the open front side is formed by the region between the limb ends. The pressing force of the limb of such a radial shaft sealing ring at the wheel carrier side and/or at the wheel hub side can advantageously depend on the pressure at the open front side of the radial shaft sealing ring. The pressing force and thus the sealing effect of the radial shaft sealing ring can in this manner be adapted to the respective pressure within the adjacent compressed air annular space at the rear by pressure changes within the respective annular lubricant space in order to achieve a respective sufficient sealing effect with as small a wear as possible.

It must still be noted in connection with the invention that the indications of direction "axial" and "radial" generally refer to the axis of rotation of the wheel hub.

It must further be noted that the terms "wheel carrier" and "wheel hub" do not necessarily designate a single component, but rather refer to the respective arrangement of parts fixedly connected to one another since both the wheel carrier and the wheel hub can naturally also be designed in multiple parts. The wheel carrier can, for example, also comprise a replaceable wear sleeve on which the sealing rings slide which seal a respective compressed air annular space or annular lubricant space, as will still be explained with reference to the Figures.

BRIEF DESCRIPTION OF THE DRAWINGS

The invention will be explained only by way of example in the following with reference to the drawings. In these.

DETAILED DESCRIPTION OF THE PREFERRED EMBODIMENTS

The rotary feedthrough shown comprises a wheel carrier having an axle arm 11, at which a wheel hub 13 is rotatably supported with respect to an axis of rotation A. This support is effected via two roller element bearings 15, 15' which are here configured as taper roller bearings.

Figure 1:
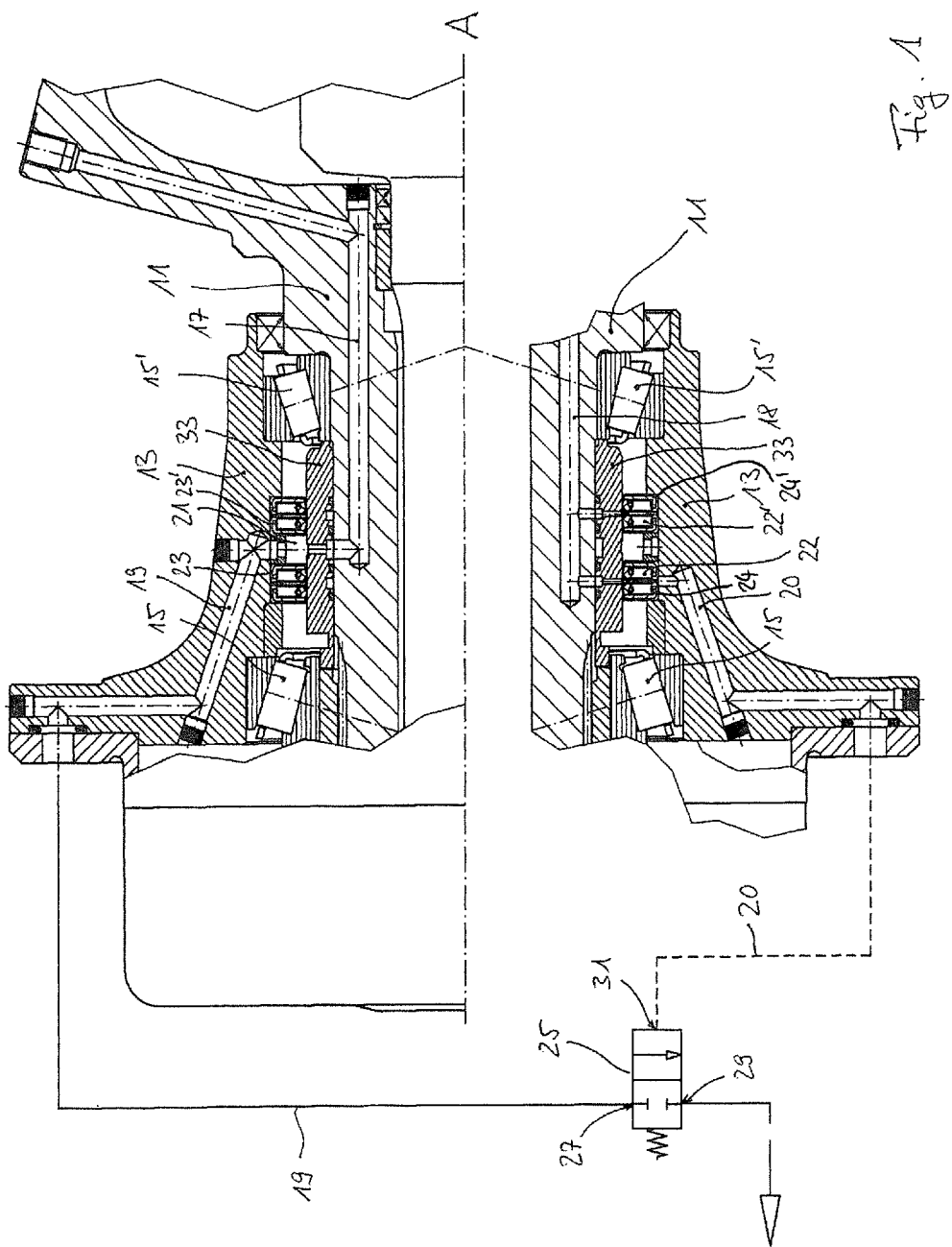
FIG. 1 shows a part of a rotary feedthrough in an axial section.
Figure 2:
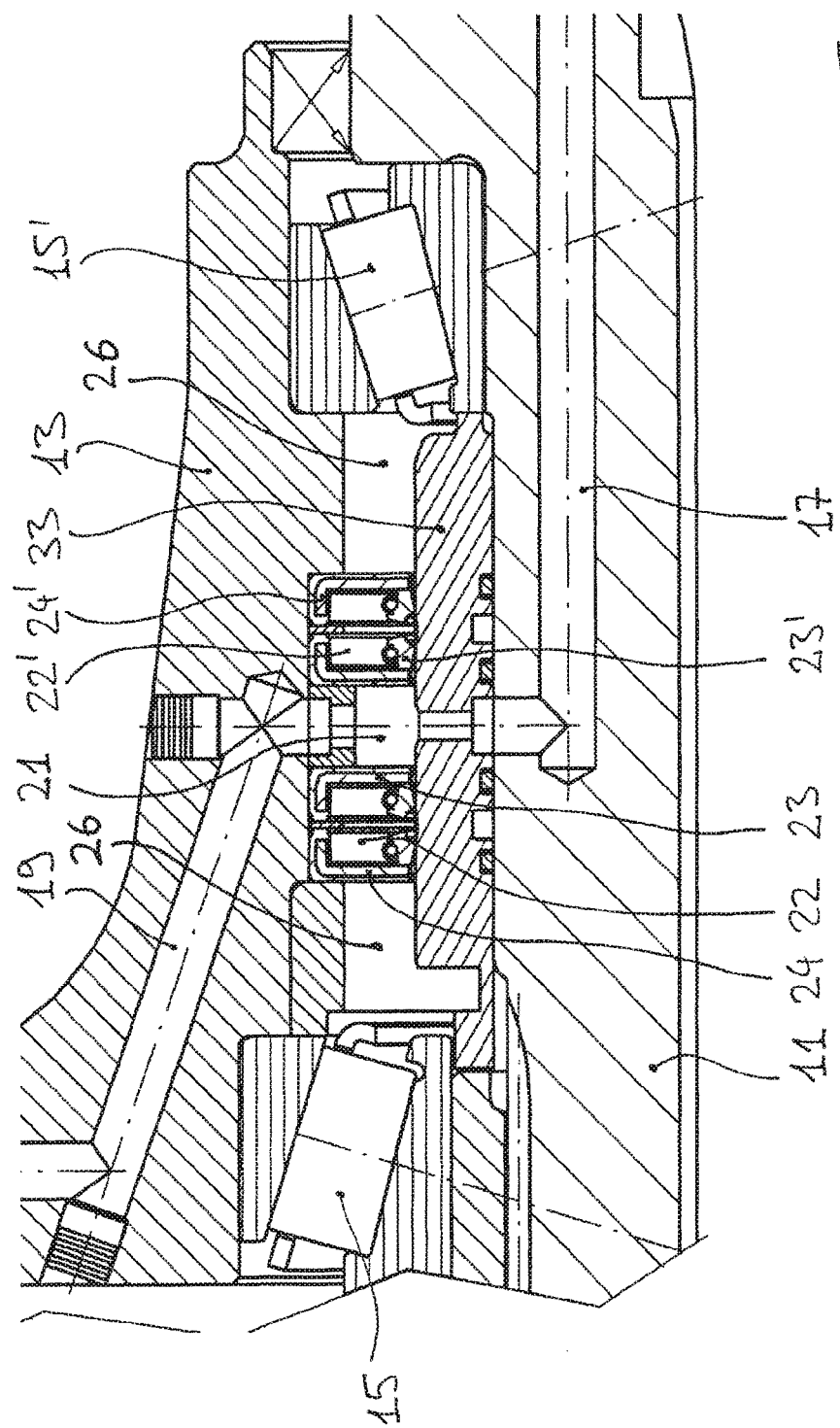
FIGS. 2 and 3 are detailed views of the upper part or of the lower part of FIG. 1.

A tire of the respective vehicle wheel is mounted at the wheel hub 13 (not shown). To be able to set the air pressure in the tire to a desired value, a compressed air passage 17 is provided in the axle arm 11 (cf. the upper part of FIG. 1 and FIG. 2), which compressed air passage being connected to a compressed air source (not shown). This compressed air passage 17 communicates with a compressed air passage 19 of the wheel hub 13 which opens at a compressed air port 27 of a valve 25 which is arranged at the respective wheel, in particular at the wheel hub 13 or at the rim. In this respect, independently of the rotational position of the wheel hub 13 relative to the axle arm 11 and also generally on a rotation of wheel hub 13, the compressed air passages 17, 19 are connected to one another via a compressed air annular space 21 which is formed in the radial intermediate space between the axle arm 11 and the wheel hub 13. In this manner, compressed air can be supplied from the compressed air source to the valve 25 through the compressed air passages 17, 19 in order to increase the air pressure in the tire. A pressure reduction in the tire is also possible in a corresponding manner, with the air from the tire either being supplied to the compressed air source (which actually requires a pressure drop in the direction of the compressed air source) or being let off into the environment (for which purpose, the valve 25, however, has to be designed as a 3/2-way valve having a venting port and a venting passage in the wheel hub 13, not shown).

The valve 25 shown is a controllable 2/2-way valve which can be selectively blocked via a control port 31 or which can be controlled to allow compressed air pass to pass from a compressed air port 27 to a working port 29 (in the direction of the arrow). The working port 29 is in this respect connected to the inner space of the tire such that the tire can be filled with compressed air from the compressed air passages 17, 19. The valve 25 is preloaded into a blocking state.

Figure 3:
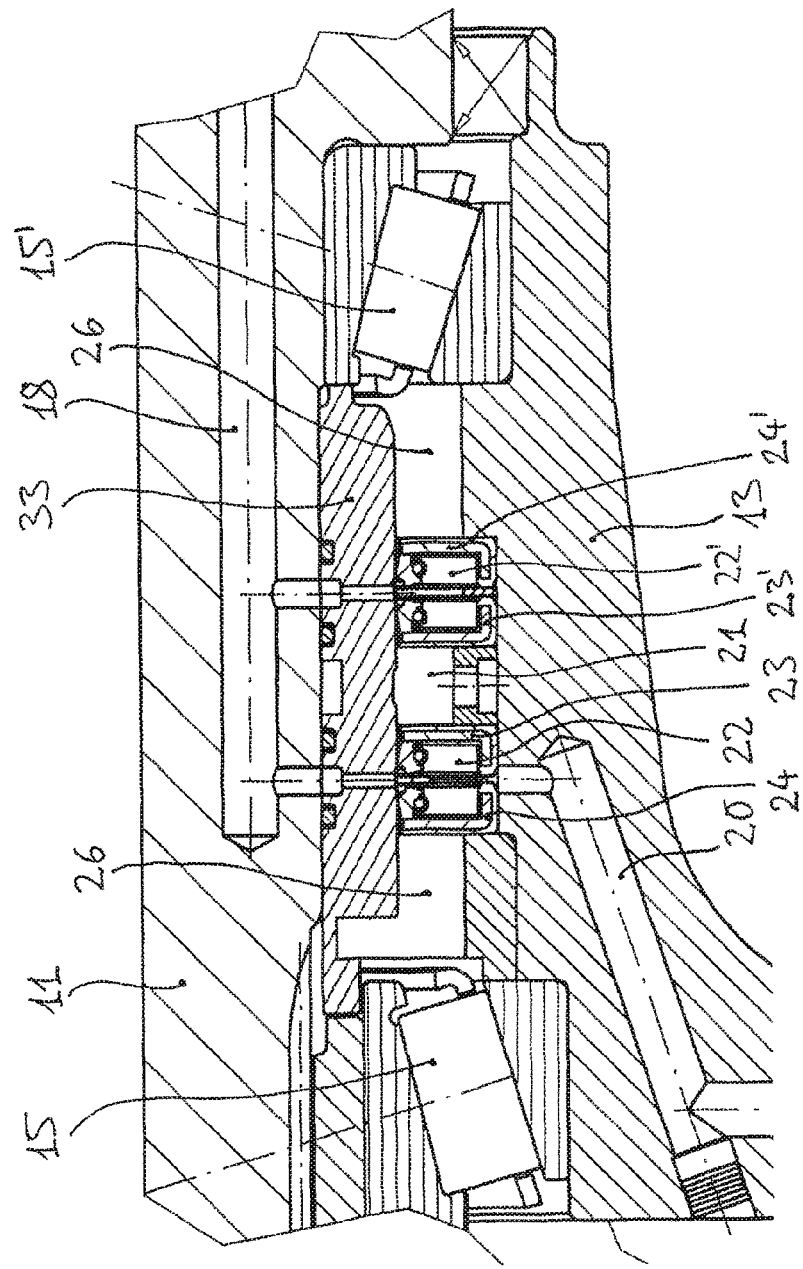

A respective annular lubricant space 22 22' (cf. the lower part of FIG. 1 and FIG. 3) which is sealed by sealing rings 23 23' with respect to the compressed air annular space 21, is formed at both sides axially adjacent to the named compressed air annular space 21 for the connection of the compressed air passages 17, 19. The sealing rings 23 23' are in this respect formed as radial shaft sealing rings having an open front side and a closed back extending in a radial direction. Each of the radial shaft sealing rings 23, 23' is substantially of "U" shape—with respect to the axial section shown—with the open front side facing the respective annular lubricant space 22 22'. A limb of the "U" (of a radially outwardly disposed seat surface) of the respective radial shaft sealing ring 23 23' contacts an inner jacket surface of the wheel hub 13 in a force-transmitting manner and thus in a rotationally fixed manner. The other limb of the "U" (of a radially inwardly disposed sealing surface) faces the axle arm 11 and sealingly contacts a cylindrical running surface of an optional wear sleeve 33 which is fixedly connected to the axle arm 11.

The provision of a wear sleeve 33 has the advantage that it is not the total wheel carrier which has to be replaced when the sealing running surfaces are worn, but rather that it is sufficient only to replace the wear sleeve 33. Furthermore, the wear sleeve 33 offers the advantage of a simple machinability. However, alternatively to the use of the wear sleeve 33, the radial shaft sealing rings 23, 23' can also be arranged directly at the axle arm 11.

The annular lubricant spaces 22, 22 are sealed axially outwardly, i.e. with respect to a remaining intermediate space 26 at the respective side remote from the compressed air annular space 21, by a respective radial shaft sealing ring 24 or 24'. Each of the two annular lubricant spaces 22, 22' is thus bounded at both sides by a respective one of the four radial shaft sealing rings 23, 23', 24, 24', with the compressed air annular space 21 being bounded at both sides by the two middle 23, 23' ones of the four radial shaft sealing rings. The two outer radial shaft sealing rings 24, 24' also have an open front side and a closed back, with the open front side in turn facing the respective annular lubricant space 22, 22'.

A lubricant passage 18 is also formed in the axle arm 11 beside the compressed air passage 17 and is connected directly or indirectly at one end to a lubricant source (not shown; e.g. a pump or a pneumatically hydraulic pressure converter within a substantially closed lubricant circuit). At the shown other end, the lubricant passage 18 communicates with the annular lubricant spaces 22, 22' and supplies it with lubricant, for instance, lubricating oil. The pressure of the lubricant in the annular lubricant spaces 22, 22' can in this respect be set via the lubricant passage 18 to adapt the pressing force of the sealing rings 23, 23' to the wear sleeve 33. The pressure in the annular lubricant spaces 22, 22' can in particular be temporarily increased even when the pressure in the compressed air annular space 21 is also increased for filling the tire. In this manner, a reliable seal of the compressed air annular space 21 adapted to the respective situation can be achieved with minimal wear.

A lubricant passage 20 is furthermore also provided in the wheel hub 13 in addition to the compressed air passage 19, said lubricant passage communicating with one of the annular lubricant spaces 22, 22' so that the lubricant passage 18 of the axle arm 11 and the lubricant passage 20 of the wheel hub 13 are connected to one another via the annular lubricant space 22. The lubricant passage 20 of the wheel hub 13 opens into the control port 31 of the valve 25. Not only the pressure in the annular lubricant spaces 22, 22' can thus be set but also the pressure applied to the control port 31 of the valve 25 can be set and the valve 25 can be controlled thereby. The control port 31 of the valve 25 can in this respect be directly connected to the lubricant passage 20 when it is suitable for evaluating the pressure of the lubricant in the lubricant passage 20 directly and to convert it into a respective state of the valve 25. A pressure converter (not shown) can otherwise be provided between the lubricant passage 20 and the control port 31 by which pressure converter the hydraulic pressure of the lubricant in the lubricant passage 20 is, for instance, converted into a mechanical actuation of the control port 31 of the valve 25.

Whereas the lubricant and its pressure in the one annular lubricant space 22', which is not (directly) connected to the lubricant passage 20 of the wheel hub 13, primarily serves to lubricate the associated sealing ring 23' for a reliable sealing of the compressed air annular space 21 (and to lubricate the sealing ring 24' and optionally also adjacent bearings 15, 15' or further elements) and to reduce the wear, the other annular lubricant space 22 at the same time additionally has a supplementary function. Lubricant can be transferred to the lubricant passage 20 of the wheel hub 13 via this annular lubricant space 22, namely in accordance with the same principle as in the compressed air annular space 21, independently of the rotational position of the wheel hub 13 relative to the axle arm 11, such that the lubricant passages 18, 20 of the axle arm 11 and of the wheel hub 13 permanently communicate with one another via the annular lubricant space 22.

The tire pressure regulation can in this manner admittedly be designed with two passages. It is however not necessary to provide a further compressed air annular space for this purpose in the intermediate space between the axle arm 11 and the wheel hub 13 since, instead of a second compressed air passage in the wheel hub 13, a lubricant passage 20 is formed which can be provided with lubricant from one of the annular lubricant spaces 22, 22' anyway provided for sealing the compressed air annular space 21. Ultimately only the additional lubricant passage 20 within the wheel hub 13 is thus necessary for the control of the valve 25. This allows a particularly compact construction of the rotary feedthrough for a simple two-passage system (small construction depth along the direction of arrangement of the radial shaft sealing rings 23, 23', 24, 24', i.e. in an axial direction). The lubricant provided for the lubrication of the roller element bearings 15, 15' is in this respect advantageously used for the control of the valve 25.

Differing from the representation in the drawings, it is generally also possible that the respective radial shaft sealing ring 23, 23', 24, 24' comprises a radially inner seat surface contacting the wheel carrier with force transmission (axle arm 11) and a radially outer sealing surface sliding along the rotating wheel hub 13.

The intermediate space formed between the wheel carrier 11 and the wheel hub 13 can furthermore, differing from the representation in the drawings, extend, starting from the wheel carrier 11, to the wheel hub 13 in an axial direction, with in this case the compressed air annular space 21 and the respective annular lubricant space 22, 2T being sealed with respect to one another in the radial direction.

The invention claimed is:

1. A rotary feedthrough for a motor vehicle wheel having tire pressure regulation, having a wheel carrier (11) and having a wheel hub (13) rotatably supported on the wheel carrier (11),
   wherein a compressed air annular space (21) and at least one annular lubricant space (22, 22), which are sealed with respect to one another, are formed in an intermediate space between the wheel carrier (11) and the wheel hub (13), wherein the compressed air annular space (21) communicates with a compressed air passage (17) of the wheel carrier (11) and with a compressed air passage (19) of the wheel hub (13),
   wherein the compressed air passage (19) of the wheel hub (13) furthermore communicates with a controllable valve (25) in order to selectively fill a tire of the motor vehicle wheel with compressed air or to deflate the tire,
   wherein the annular lubricant space (22, 22') communicates with a lubricant passage (18) of the wheel carrier (11), and
   wherein the annular lubricant space (22, 22') also communicates with a lubricant passage (20) of the wheel hub (13), which lubricant passage leads to a control port (31) of the valve (25) in order to selectively control the valve (25) for the passage of compressed air.

2. A rotary feedthrough in accordance with claim 1,
   wherein the compressed air annular space (21) and the annular lubricant space (22, 22) are bounded from one another by a sealing ring (23, 23').

3. A rotary feedthrough in accordance with claim 2,
   wherein at least one of the compressed air annular space (21) and the annular lubricant space (22, 22') is bounded in two mutually opposite directions by a respective sealing ring (23, 23', 24, 24') with respect to a remaining intermediate space (26) between the wheel carrier (11) and the wheel hub (13).

4. A rotary feedthrough in accordance with claim 2,
   wherein a sealing effect of the sealing ring (23, 23') bounding the compressed air annular space (21) is controllable such that a pressing force of the sealing ring (23, 23') is increased with respect to the wheel carrier (11) or the wheel hub (13) by increasing the pressure of a lubricant located in the annular lubricant space (22, 22).

5. A rotary feedthrough in accordance with claim 1,
   wherein the intermediate space extends from the wheel carrier (11) to the wheel hub (13) in a radial direction, with the compressed air annular space (21) and the annular lubricant space (22, 22') being sealed with respect to one another in an axial direction.

6. A rotary feedthrough in accordance with claim 1,
   wherein exactly one compressed air annular space (21) communicating with the compressed air passage (19) of the wheel hub is formed in the intermediate space between the wheel carrier (11) and the wheel hub (13).

7. A rotary feedthrough in accordance with claim 1,
   wherein the wheel hub (13) comprises exactly one compressed air passage (19) communicating with the compressed air annular space (21).

8. A rotary feedthrough in accordance with claim 1,
   wherein a plurality of annular lubricant spaces (22, 22'), which communicate with the lubricant passage (17) of the wheel carrier (11) or with a respective separate lubricant passage of the wheel carrier, are formed in the intermediate space between the wheel carrier (11) and the wheel hub (13).

9. A rotary feedthrough in accordance with claim 1,
   wherein the lubricant passage (20) of the wheel hub (13) is connected to the control port (31) of the valve (25) directly or via a pressure converter.

10. A rotary feedthrough in accordance with claim 1,
    wherein two annular lubricant spaces (22, 22') are formed in the intermediate space between the wheel carrier (11) and the wheel hub (13), and wherein the compressed air annular space (12) is formed between the two annular lubricant spaces (22, 22').

11. A rotary feedthrough in accordance with claim 10,
    wherein the rotary feedthrough comprises four sealing rings (23, 23', 24, 24'), wherein a first one of the two annular lubricant spaces (22, 22') is bounded by a first sealing ring (23) at a first side and a second sealing ring (24) at a second side and a second of the two annular lubricant spaces (22, 22') is bounded by a third sealing ring (23') at a first side and a fourth sealing ring (24') at a second side.

12. A rotary feedthrough in accordance with claim 11, wherein the intermediate space extends from the wheel carrier (11) to the wheel hub in a radial direction, wherein the compressed air annular space (21) is formed axially between the two annular lubricant spaces (22, 22'), and wherein the compressed air annular space (21) and the two annular lubricant spaces (22, 22') are bounded by the sealing rings (23, 23', 24, 24') in an axial direction.

13. A rotary feedthrough in accordance with claim 11, wherein each of the four sealing rings (23, 23', 24, 24') is formed as a radial shaft sealing ring which comprises an open front side and a closed back which extends in a radial direction, with the open front side of each radial shaft sealing ring facing one of the two annular lubricant spaces (22, 22').

* * * * *